United States Patent
Achaerandio Fernández et al.

(10) Patent No.: US 12,072,124 B2
(45) Date of Patent: Aug. 27, 2024

(54) ROTATING SUPPORT DEVICE FOR A TORSION BEAM

(71) Applicant: KTRSOLAR TECH, S.L., Sarriguren (ES)

(72) Inventors: Álvaro Achaerandio Fernández, Sarriguren (ES); Andrés Jiménez De La Cruz, Sarriguren (ES); Francisco Serrano Piris, Sarriguren (ES)

(73) Assignee: KTSolar Tech, S.L. (ES)

( * ) Notice: Subject to any disclaimer, the term of this patent is extended or adjusted under 35 U.S.C. 154(b) by 380 days.

(21) Appl. No.: 17/621,660

(22) PCT Filed: Jun. 18, 2020

(86) PCT No.: PCT/ES2020/070393
§ 371 (c)(1),
(2) Date: Dec. 21, 2021

(87) PCT Pub. No.: WO2020/260736
PCT Pub. Date: Dec. 30, 2020

(65) Prior Publication Data
US 2022/0357077 A1    Nov. 10, 2022

(30) Foreign Application Priority Data

Jun. 27, 2019    (ES) .................................. P201930597

(51) Int. Cl.
*F24S 30/425*    (2018.01)
*F16C 33/04*     (2006.01)

(52) U.S. Cl.
CPC .......... *F24S 30/425* (2018.05); *F16C 33/046* (2013.01)

(58) Field of Classification Search
CPC .......... F24S 30/425; F24S 30/40; F24S 30/00; F16C 33/046; F16C 17/00; F16C 17/02; F16C 17/022; F16C 35/02
(Continued)

(56) References Cited

U.S. PATENT DOCUMENTS 3,972,576 A * 8/1976 Hill ........................... F16C 9/02
                                                          384/276
RE32,764 E * 10/1988 Smith ..................... F16C 17/10
                                                          384/275
(Continued)

FOREIGN PATENT DOCUMENTS

EP    3410033 A1    12/2018
ES    2397777 A1    3/2013
(Continued)

OTHER PUBLICATIONS

International Search Report issued by the European Patent Office in related patent application PCT/ES2020/070393 and mailed Sep. 16, 2020, English language translation provided.
(Continued)

*Primary Examiner* — Nkeisha Smith
(74) *Attorney, Agent, or Firm* — MASCHOFF BRENNAN

(57) ABSTRACT

A rotating support device for a torsion beam is be coupled to a support pillar, especially applicable in solar power plant installations which reduces the number of parts used and facilitates the assembly. The device has a clamp which can be coupled to the support pillar having a cylindrical inner area, a bushing intended to be positioned inside the clamp and which has the possibility of rotation together with the torsion beam with respect to the clamp and a retaining part
(Continued)

which can be coupled in the slot which in an assembly situation protrudes in height with respect to the central sector of the clamp.

10 Claims, 6 Drawing Sheets

(58) Field of Classification Search
USPC .................................................. 248/229.14
See application file for complete search history.

(56) References Cited

U.S. PATENT DOCUMENTS

| | | | | |
|---|---|---|---|---|
| 8,807,839 B2* | 8/2014 | Jang | .................. | F24S 25/60 |
| | | | | 384/275 |
| 9,303,684 B2 | 4/2016 | Lumbreras | | |
| 10,156,254 B2* | 12/2018 | Bhosale | ................ | F16C 33/046 |
| 10,584,902 B2* | 3/2020 | Ros Ruiz | .............. | F16B 7/0486 |
| 2012/0219243 A1* | 8/2012 | Jang | ..................... | F24S 30/425 |
| | | | | 384/129 |
| 2013/0112166 A1* | 5/2013 | Lee | ......................... | F16C 35/02 |
| | | | | 123/195 R |
| 2019/0068112 A1* | 2/2019 | Gnanapa | ................ | F16M 11/18 |
| 2019/0158017 A1* | 5/2019 | Hu | .......................... | H02S 20/32 |
| 2022/0149773 A1* | 5/2022 | Reznar | ................. | F16C 23/046 |
| 2022/0333642 A1* | 10/2022 | Sasidharan | ............ | F24S 25/12 |

FOREIGN PATENT DOCUMENTS

| | | |
|---|---|---|
| KR | 20090108261 A | 10/2009 |
| KR | 20110048497 A1 | 5/2011 |

OTHER PUBLICATIONS

Written Opinion of the International Searching Authority issued by the European Patent Office in related patent application PCT/ES2020/070393 and uploaded to WIPO Patentscope Dec. 30, 2020, in English.

* cited by examiner

A-A

B-B

ROTATING SUPPORT DEVICE FOR A TORSION BEAM

OBJECT OF THE INVENTION

The present invention relates to a rotating support device for a torsion beam, which can be coupled to a support pillar, especially applicable in solar power plant installations.

More particularly, the invention relates to a support device comprising a clamp, a bushing which houses a beam, and a retaining part by means of which the bushing is retained in the clamp, such that the parts used are reduced, the adjustment of geometric tolerances is correct and the placement of the rotation support is simplified for the operator, since the device is made up of few parts and additional tools are not necessary.

BACKGROUND OF THE INVENTION

In the state of the art, the use of devices is known whereon the load of a beam is supported at the same time that the rotation thereof is enabled. For example, in the sector of solar power plant installations, there is a surface with a plurality of solar panels joined by means of a beam which pivots on a north-south axis in order to orient the panels depending on the position of the sun. This beam is clamped by a bearing which enables the rotation thereof, arranged in a clamp fastened to a support beam, which transmits the loads to the foundation.

For example, document ES2397777 discloses a support comprising a clamp which surrounds parts that embrace a rotational beam, wherein the plastic parts have a spherical shape on the outside corresponding to a reciprocal shape on the inside of the clamp, such that the beam is retained axially by the clamp. The clamp is made up of two segments which are screwed to each other and to the clamp confining the two parts.

Another example of a rotating support includes a clamp formed by a single part or ferrule into which two plastic parts are introduced which embrace the rotational beam. Additionally, u-bolts are used as retainers for the plastic parts.

However, said devices have a series of drawbacks. Moreover, the use of fastening screws produces constant comprehension of the plastic parts which can cause the joint to loosen and cause the plastics to crack. In the case of the use of u-bolts, the very u-bolt can cause excessive friction with the clamp. Furthermore, the number of components required is very high and the installation by the operator is complex.

DESCRIPTION OF THE INVENTION

The present invention aims to solve some of the problems mentioned in the state of the art.

The present invention discloses a rotating support device for a torsion beam, which can be coupled to a support pillar. The support device comprises a clamp, which can be coupled to the support pillar with a cylindrical inner area, a bushing, intended to be positioned inside the clamp, which has the possibility of rotation together with the torsion beam with respect to the clamp, and a retaining part.

The bushing comprises a lower part comprising a first central sector which longitudinally has an outer area with a partially cylindrical shape complementary to the inner area of the clamp. The lower part comprises two lower distal sectors comprising a first projection respectively which extends in height with respect to the central sector which constitutes a stop in a longitudinal direction in the assembly situation of the lower part in the clamp, preventing the lower part from coming out of the clamp. The lower part further comprises a lower cavity.

The bushing comprises an upper part having a second central sector which longitudinally has an outer area with a partially cylindrical shape complementary to the inner area of the clamp. The upper part further comprises a rear upper distal sector, comprising a second projection which extends in height with respect to the second central sector which constitutes a stop in a longitudinal direction in the assembly situation of the upper part in the clamp. The upper part has a front upper distal sector, comprising a slot. The upper part likewise comprises an upper cavity, wherein the upper cavity is arranged facing the lower cavity in an assembly situation such that they form a hollow intended to house a torsion beam.

The retaining part can be coupled in the slot such that in an assembly situation it protrudes in height with respect to the clamp, preventing the movement of the bushing with respect to the clamp in a longitudinal direction.

Thus, in an assembly situation, the lower part of the bushing is retained in the clamp longitudinally in both directions thanks to the aforementioned elements.

The central area of the first central sector has a partially cylindrical complementary shape such that a movement of the lower part with respect to the torsion beam is enabled. The lower part is the first one to be assembled inside the clamp, since by having the first projections as a stop, it needs clearance to be introduced.

When placing the lower part, the torsion beam is preferably not placed yet, for which reason it can be easily introduced. If the beam were placed, there is an upper clearance which enables, for example, the clamp to move with respect to the structure in order to introduce the lower part. The lower cavity enables the torsion beam to be partially embraced and therefore the shape of the lower cavity is determined by the shape of the beam.

The upper part is introduced into the clamp through the front upper distal sector comprising the slot, since it is the only sector that has no projections and can be placed with a longitudinal sliding movement. The retaining part in an assembly situation in the slot of the upper part protrudes in height with respect to the clamp, thus blocking the movement of the upper part in both directions longitudinally and the bushing is retained in the clamp, being able to rotate together with the torsion beam and without being able to move longitudinally. This enables, in an assembly situation and with the lower part assembled, the upper part to be easily introduced and leave the bushing retained. The central area of the second central sector has a partially cylindrical complementary shape such that a movement of the upper part with respect to the torsion beam is enabled.

The upper part likewise has an upper cavity which enables the torsion beam to be embraced and the shape thereof is determined by the shape of the beam. When the upper cavity is facing the lower cavity, a hollow of the bushing is created. This hollow has a cross section complementary to a transverse cross section of a torsion beam, which can be polygonal, circular or a combination of both, such that it houses a torsion beam with a cross section having this geometry. When the torsion beam rotates, it pulls the upper part and the lower part of the bushing with it, enabling the rotation thereof inside the clamp. In this manner, the device supports the torsion beam enabling the rotation thereof.

The clamp confines the upper and lower part of the bushing, leaving a minimum space which enables the bushing to rotate inside the clamp. The confinement of the parts is achieved by avoiding the use of fastening screws, which can cause the joint to loosen and cause the parts to crack. In this manner, the mechanical joints between the components are eliminated, reducing the risk of breakage, loosening, etc.

The clamp can be coupled to the support pillar, which is what enables it to adopt different heights and inclinations, such that it can absorb slopes in the terrain and positioning errors of the support pillar. The clamp can be coupled to the support pillar preferably by means of an intermediate regulation part and mechanical joining elements. This is especially advantageous since the device is especially applicable in solar panel installations, wherein the terrain is uneven such that these deviations can be compensated for by the support and regulation pillar.

The upper part may comprise at least one vertical guide inside the slot and the retaining part may comprise at least one projection which can slide through the vertical guide. By means of this configuration, the movement of the introduction of the retaining part into the slot is guided, in addition to better retaining the retaining part and minimising the clearances. This projection can be complementary to the vertical guide, having a width slightly smaller than the width of the vertical guide such that the retaining part is better fastened in the slot of the upper part. The thickness of the projections corresponds to that of the vertical guide such that, in addition to guiding the part, it better fits the part.

Additionally, the upper part may comprise at least one vertical partition inside the slot. This vertical partition extends from side to side of the inner surfaces which define the slot and there may be, for example, two vertical partitions parallel to each other. The retaining part may comprise a slit such that the slit fits into the partition. Thanks to this vertical partition, the guiding of the retaining part inside the slot is performed with greater precision and the end of the vertical partition acts as a stop with the slit, preventing the retaining part from moving beyond the predetermined position thereof in an assembly situation.

The upper part may comprise inside the slot two channels in the sides and the retaining part may comprise two arms which are introduced into the channels in an assembly situation. Thus, the surface of the retaining part introduced in the slot increases, which gives it greater stability.

Additionally, the upper part can comprise inside the slot a housing adjacent to the channels and the retaining part comprises at least one anchoring flange located in the lower area of the arms, which can be fitted in the housing. This is especially advantageous since the anchoring flange is fitted in the housing, forcing the retaining part to adopt the predetermined assembly position.

The retaining part may comprise an opening facing the anchoring flange which enables the anchoring flange to bend in order to facilitate the anchoring thereof in the housing. In other words, the anchoring flange is collapsible and when it enters the channels of the slot, it bends towards the opening, and when it reaches the housing, it expands again, preventing the retaining part from coming out of the slot.

Additionally, the retaining part may comprise an upper bridge which joins the two arms wherein at least one projection and at least one slit are defined, which constitutes a gripping surface facilitating the handling thereof. The upper bridge is understood as the area protruding from the clamp. The retaining part may incorporate a symmetrical gripping surface, such that decompensation and possible wear during use are prevented. The bridge comprises at least one lateral protuberance which extends in height. In this manner, the handling and introduction of the retaining part is easier for the operator.

Preferably, the bushing can be made of a plastic material. The plastic material is favourable when there is a lot of friction, for which reason it is suitable to be used in the bushing. Furthermore, it must have suitable properties in order to extend the useful life thereof, taking into account the temperature conditions to which it will be exposed, in situations with extreme heat. Preferably, materials are used which have good behaviour against UVA rays, do not absorb moisture and are resistant to abrasion.

The clamp may preferably be made of a metal material. Since it has to receive impacts and stresses from the support beam, the metal material has better behaviour when facing this type of stress.

Additionally, the upper part and the lower part can comprise complementary walls and recesses in the area wherein they face each other, such that they are more fitted and better retained.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings constituting an integral part of the same, which by way of illustration and not limitation, represent the following.

PREFERRED EMBODIMENT OF THE INVENTION

Figure 1:
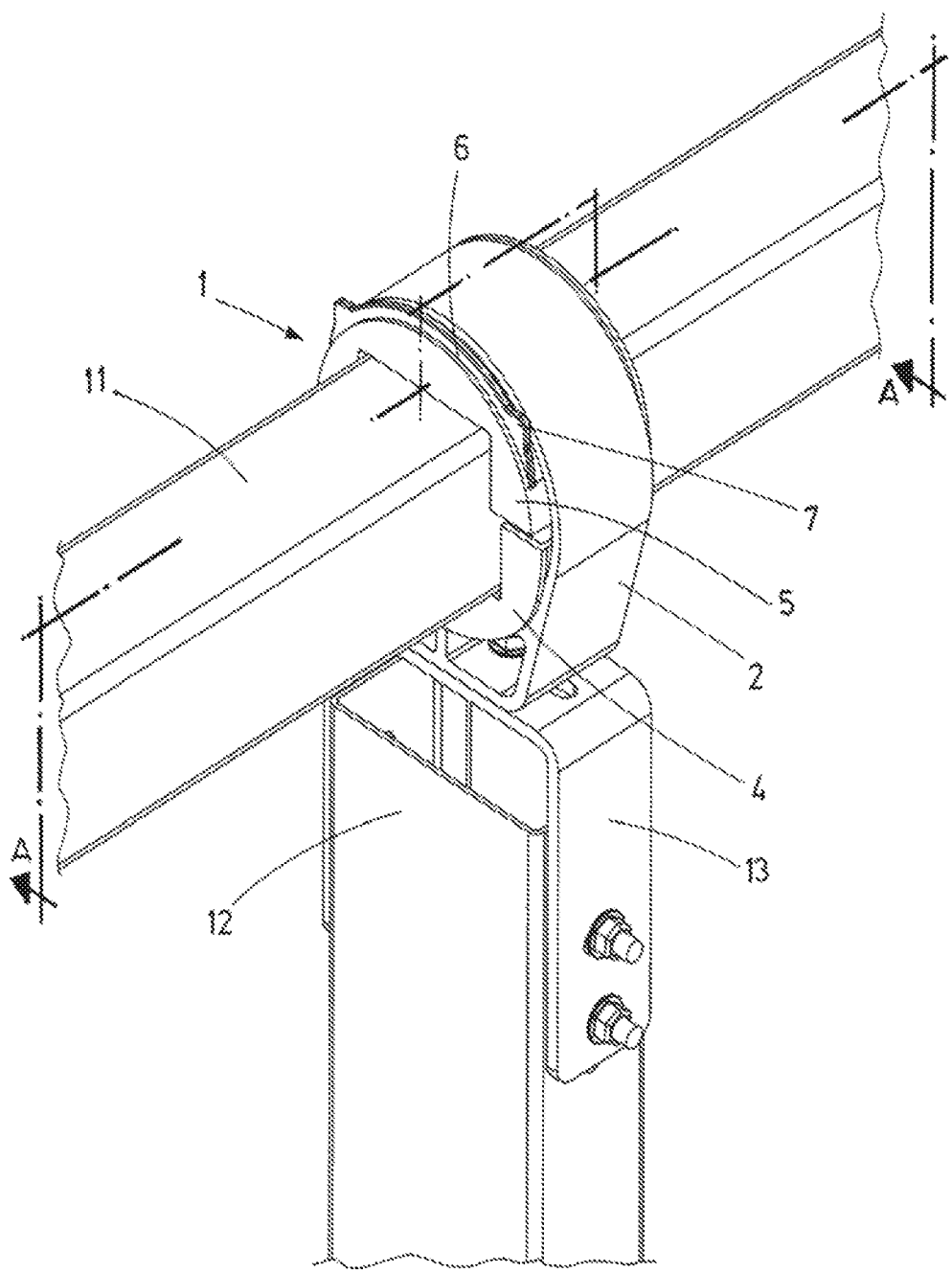
FIG. 1 shows a perspective view of the rotating support device for a torsion beam adapted in a support pillar in an assembly situation.

FIG. 1 shows a perspective view of the rotating support device (1) for a torsion beam (11) which can be coupled to a support pillar (12) comprising a clamp (2) which can be coupled to the support pillar (12). Preferably, the device (1) is coupled to the support pillar (12) by means of an intermediate regulation part (13) to which it is joined by mechanical joining elements.

It can be seen that inside the clamp (2) there is a bushing (3) which houses the torsion beam (11) and which has the possibility of rotation together with the torsion beam (11). The bushing (3) comprises an upper part (5), a lower part (4) and a retaining part (7) which can be seen in FIG. 3 in a position prior to the assembly.

Figure 2:
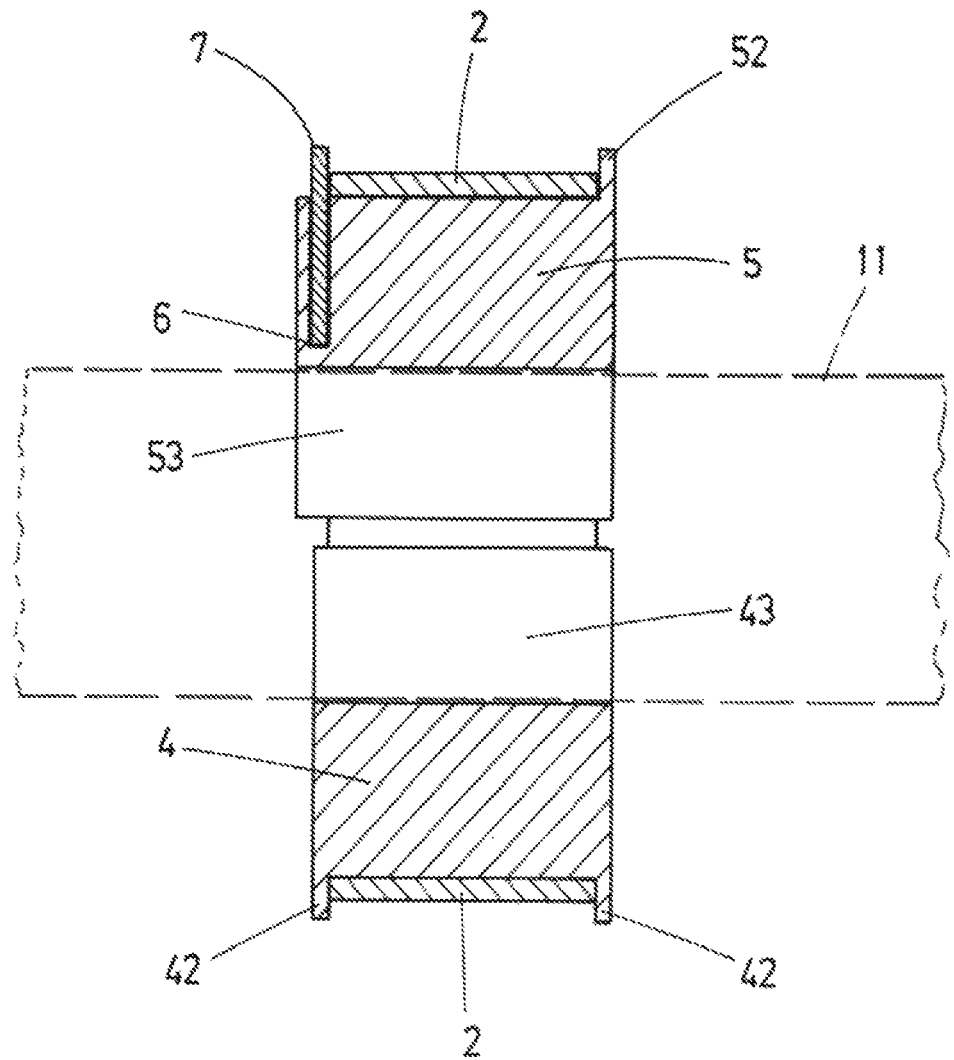
FIG. 2 shows a cross-sectional view according to A-A made in the device.

FIG. 2 shows a cross-sectional view according to A-A made in the device (1) of FIG. 1, according to the present invention. FIG. 2 shows the device (1) in an assembly situation with the clamp (2) embracing the lower part (4) and the upper part (5) of the bushing (3). The lower part (4) has first projections (42) in lower distal sectors. These projections (42) protrude from the clamp (2) retaining the lower part (4) in the clamp (2).

The upper part (5) comprises a second projection (52) in a rear upper distal sector, such that this second projection (52) retains the upper part (5) in one direction. In the front upper distal sector, the upper part (5) comprises a slot (6). In the slot (6), the retaining part (7) is introduced such that in an assembly situation this retaining part (7) protrudes from the clamp (2). In this manner, the upper part (5) is retained by the second projection (52) and by the retaining part (7).

Figure 3:
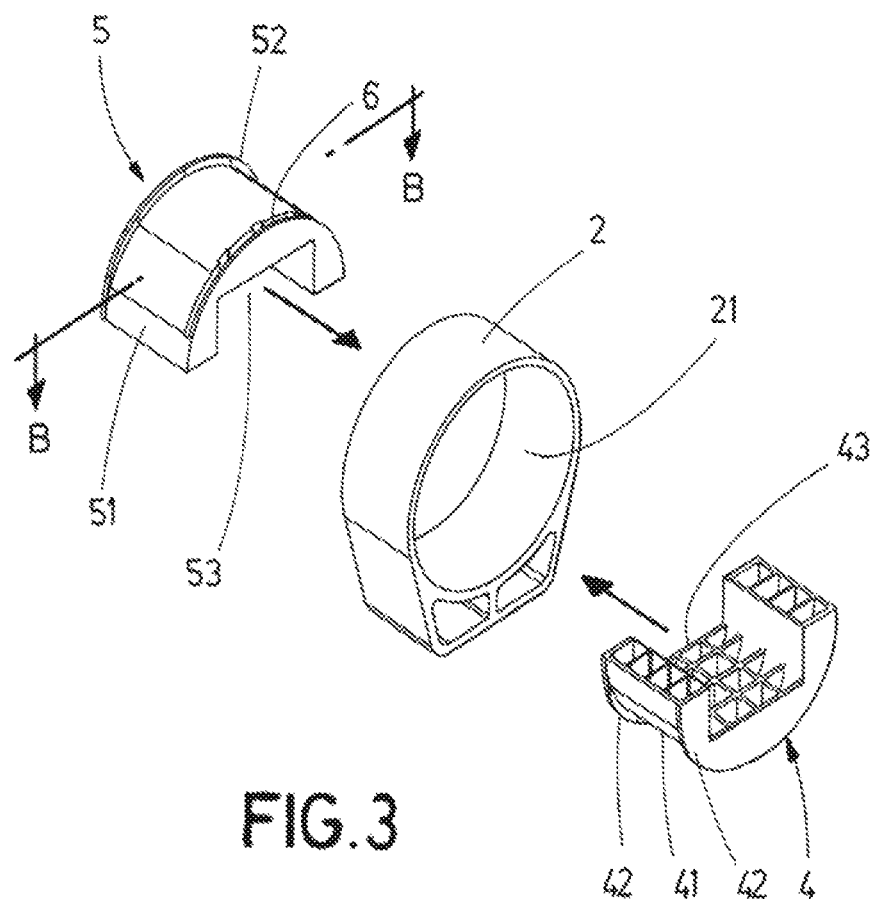
FIG. 3 shows a perspective view of the rotating support device for a torsion beam.

FIG. 3 shows a perspective view of the device (1), according to the present invention, wherein the lower part (4) and the upper part (5) of the bushing (3) are seen disassembled. The lower part (4) is illustrated, which comprises a first central sector (41) having a partially cylindrical outer area. This cylindrical area is complementary to the inner area (21) of the clamp (2). The lower part (4) comprises two lower distal sectors comprising two first projections (42) respectively and a lower cavity (43).

FIG. 3 also shows an upper part (5) with a second central sector (51) which has a partially cylindrical outer area complementary to the inner area (21) of the clamp (2). It further comprises a rear upper distal sector with a second projection (52) which extends in height with respect to the second central sector (51) and a front upper distal sector comprising the slot (6). The upper part (5) also has an upper cavity (53). The upper cavity (53) is arranged facing the lower cavity (43) in an assembly situation such that they form a hollow intended to house the torsion beam (11). The upper part (5) is introduced through the front upper distal sector (52) in the direction of the arrow.

Preferably, both the upper cavity (53) and the lower cavity (43) have a cross-section complementary to the cross-section of the torsion beam (11).

Figure 4:
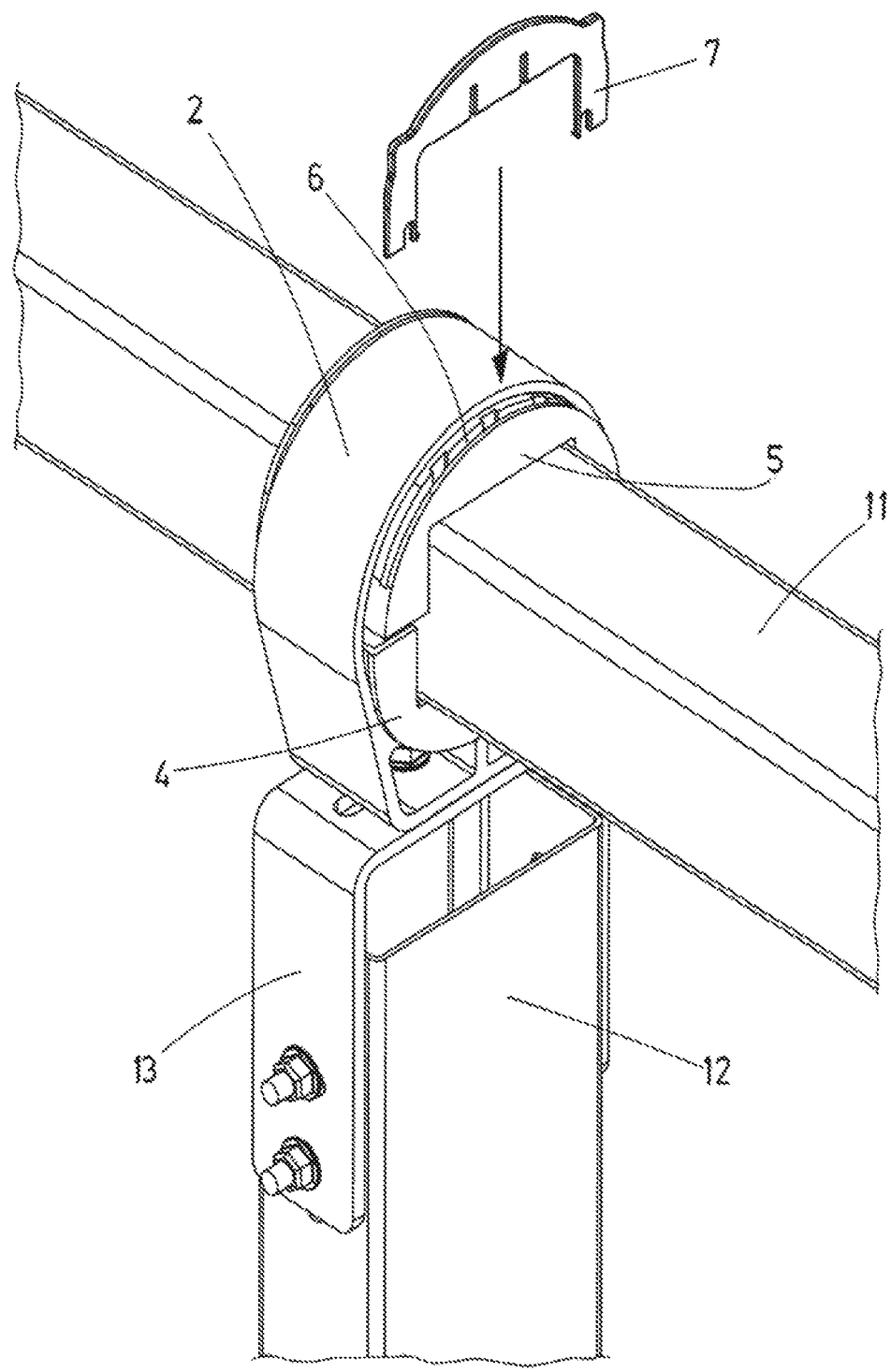
FIG. 4 shows a perspective view of the rotating support device for a torsion beam adapted in a support pillar in an intermediate assembly situation.

FIG. 4 shows a perspective view of an intermediate assembly situation of the device (1), according to the present invention. The lower part (4) and the upper part (5) are seen as assembled inside the clamp (2) and in turn embracing the torsion beam (11). In this situation, the lower part (4) cannot come out of the clamp (2) due to the first projections (42) thereof. However, the upper part (5) could come out of the clamp (2) in a longitudinal direction due to the fact that it only has the second projection (52). In order to fasten the position of the upper part (5), the retaining part (7) can be coupled in the slot (6).

Figure 5:
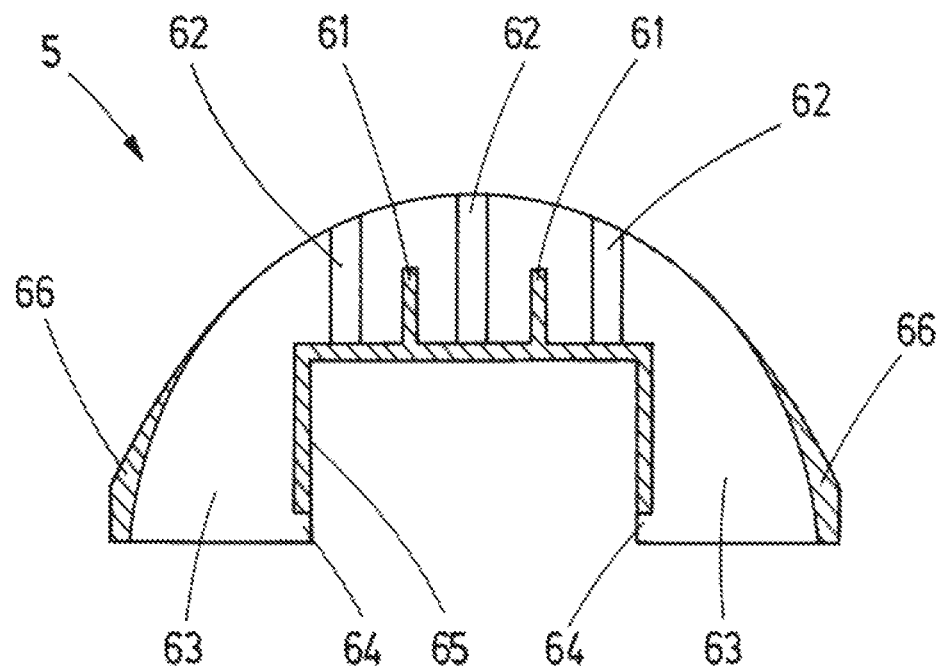
FIG. 5 shows a cross-sectional view according to B-B made in the slot.

FIG. 5 shows a cross-sectional view according to B-B of the slot (6), according to the present invention. The slot (6) comprises at least one vertical guide (62). Projections (71) of the retaining part (7) shown in FIG. 6 slide through these vertical guides (62). The vertical guides (62) extend to the outer area of the upper part (5). It is also seen that the slot (6) comprises vertical partitions (61). The height of the vertical partition (61) acts as a stop for the retaining part (7).

A border (65) is seen surrounding the upper cavity (53). A housing (64) is seen in the lower corners near the slot (6) intended to house the anchoring flange (73). The slot (6) comprises two channels (63) in the sides limited by a joining area (66) which delimits the slot (6). In another alternative embodiment, the border (65) is omitted, leaving only a portion of material near the corners so that they form a housing (64) for the anchoring flange (73).

Figure 6:
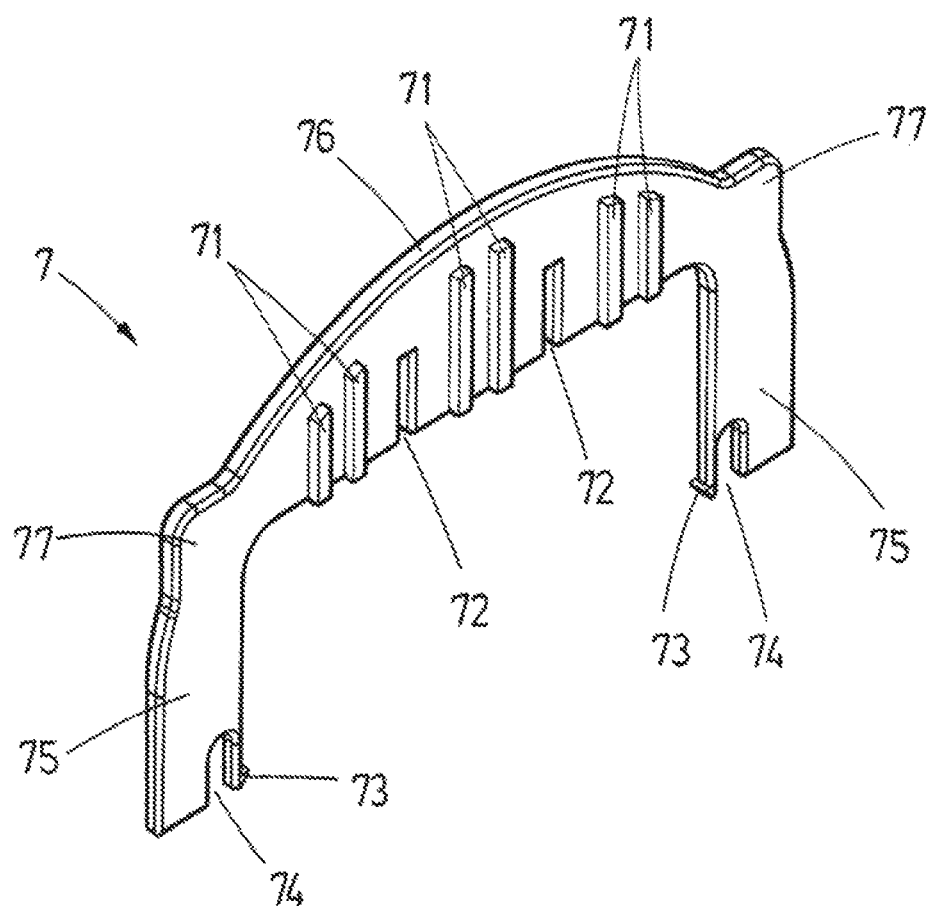
FIG. 6 shows a perspective view of the retaining part.

FIG. 6 shows a perspective view of the retaining part (7), according to the present invention. The retaining part (7) has projections (71) which can slide through the vertical guide (62). Each of the projections (71) is in a position corresponding to each side of the vertical guides (62) such that they are fitted. Furthermore, slits (72) are seen which fit into the vertical partitions (61). The number of slits (72) and projections (71) may vary as long as it corresponds to the number of vertical guides and vertical partitions (61) of the slot (6). The retaining part (7) has two arms (75) which are introduced into the channels (63) of the slot (6).

FIG. 6 likewise shows an upper bridge (76) which joins the two arms (75) wherein the projections (71) and the slits (72) are defined, which constitutes a gripping surface facilitating the handling thereof. An opening (74) is also seen facing an anchoring flange (73) such that the anchoring flange (73) can bend towards the opening (74). The upper bridge (76) can be partially curved on the outside. Preferably, the upper bridge has two protuberances (77).

The invention claimed is:

1. A rotating support device for a torsion beam, the torsion beam which can be coupled to a support pillar, the rotating support device comprising:
a clamp which can be coupled to the support pillar comprising a cylindrical inner area,
a bushing intended to be a positioned inside the clamp that is configured to rotate together with the torsion beam with respect to the clamp, the bushing comprising:
at least one lower part comprising a first central sector which longitudinally has an outer area with a partially cylindrical shape complementary to the cylindrical inner area of the clamp, two lower distal sectors that include first projections that extend in height with respect to the first central sector and that constitute a stop in a longitudinal direction that prevents the lower part from coming out of the clamp, and a lower cavity;
at least one upper part comprising a second central sector which longitudinally has an outer area with a partially cylindrical shape complementary to the cylindrical inner area of the clamp, a rear upper distal sector that includes a second projection that extends in height with respect to the second central sector and that constitutes a stop in a longitudinal direction, a front upper distal sector comprising a slot and an upper cavity, wherein the upper cavity is configured to face the lower cavity such that they form an aperture intended to house the torsion beam; and
at least one retaining part configured to be inserted into the slot such that in an installed configuration the retaining part protrudes in height with respect to the central sector of the clamp to prevent movement of the bushing with respect to the clamp in a longitudinal direction.

2. The device of claim 1, wherein the upper part comprises at least one vertical guide inside the slot and the retaining part comprises at least one projection which can slide through the vertical guide.

3. The device of claim 1, wherein the upper part comprises at least one vertical partition inside the slot and the retaining part comprises at least one slit which can be fitted in the vertical partition.

4. The device of claim 1, wherein the upper part comprises two channels in the sides inside the slot and the retaining part comprises two arms which correspond in shape and size to the channels such that in the installed configuration the two channels in the slot accommodate the two arms in the retaining part.

5. The device of claim 4, wherein the upper part comprises a housing, adjacent to the channels inside the slot and the retaining part comprises at least one anchoring flange located in a lower area of the arms which can be fitted in the housing.

6. The device of claim 5, wherein the retaining part comprises an opening facing the anchoring flange which enables the anchoring flange to bend in order to facilitate the anchoring thereof in the slot.

7. The device of claim 6, wherein the retaining part comprises an upper bridge which joins the two arms, wherein at least one projection and at least one slit are defined which constitutes a gripping surface facilitating the handling thereof.

8. The device of claim 7, wherein the bridge comprises at least one lateral protuberance which extends in height.

9. The device of claim 1, wherein the clamp is made of metal material.

10. The device of claim 1, wherein the bushing is made of plastic material.

* * * * *